June 17, 1958   D. F. MOYER   2,839,633
CIRCUIT BREAKING DEVICE
Filed July 28, 1954   3 Sheets-Sheet 1

INVENTOR.
David F. Moyer
BY
Craig R. Morton
His Attorney

INVENTOR.
David F. Moyer
BY
His Attorney

June 17, 1958  D. F. MOYER  2,839,633
CIRCUIT BREAKING DEVICE
Filed July 28, 1954  3 Sheets-Sheet 3
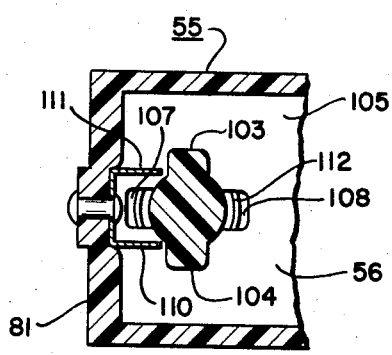
Fig. 6
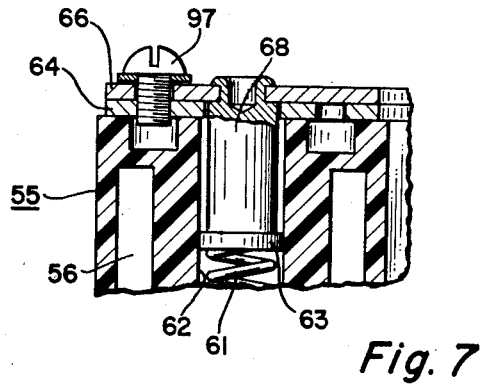
Fig. 7
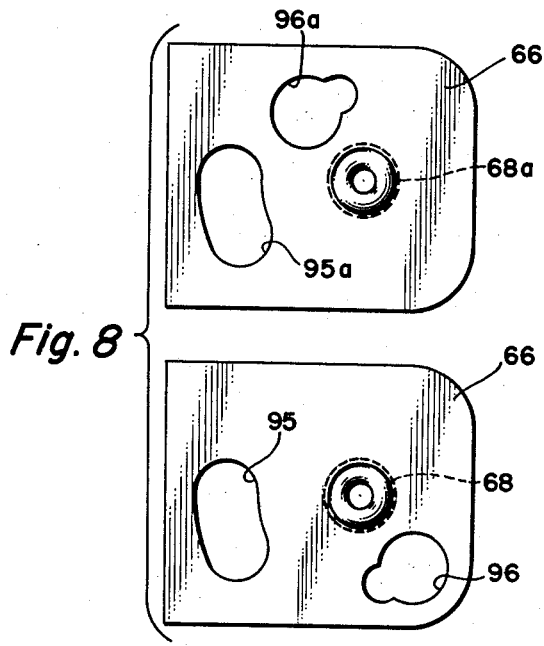
Fig. 8
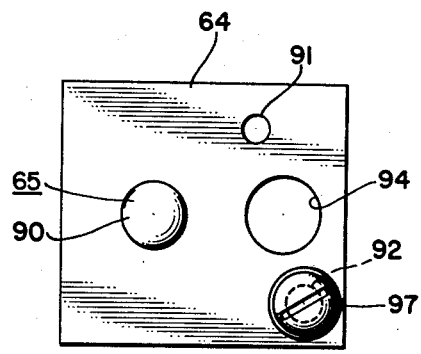
Fig. 9
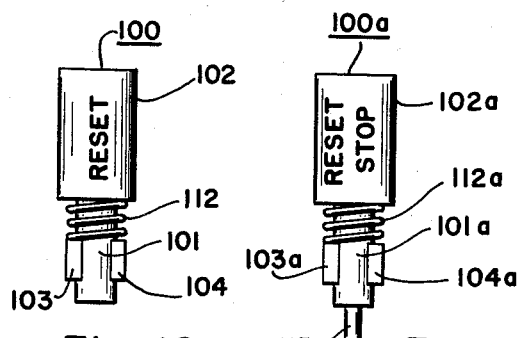
Fig. 10
Fig. 11
Fig. 12
Fig. 13
INVENTOR.
David F. Moyer
BY
His Attorney United States Patent Office 2,839,633
Patented June 17, 1958

2,839,633

CIRCUIT BREAKING DEVICE

David F. Moyer, Dayton, Ohio, assignor to General Motors Corporation, Detroit, Mich., a corporation of Delaware Application July 28, 1954, Serial No. 446,210

11 Claims. (Cl. 200—113)

This invention relates to a circuit breaking device and particularly to a thermal overload control for an electric motor to stop the electric motor in the event an overload is placed upon the motor.

It is an object of the invention to provide an overload control for an electric motor that is thermally responsive to the current supplied to the electric motor to stop the electric motor when an overload occurs on the motor tending to make it draw a heavy current, and to provide such a construction and arrangement of an overload control that it can be used with a wide range of motor sizes by varying the thermal characteristics of the thermally responsive device of the overload and by varying the tripping time and/or current of the control.

It is another object of the invention to provide a thermally responsive overload control wherein the thermal characteristics of the thermal actuating element of the overload control can be changed by placing heat absorbing masses in engagement with the thermally sensitive device, and by changing the mass of the heat absorbing mass, change in the thermal characteristics of the thermally sensitive device can be occasioned.

Still another object of the invention is to provide a thermally responsive overload control wherein the tripping time of the overload control can be changed to meet the requirements of motors of different sizes by providing for predetermined compression of a tripping control spring as regulated by plugs of different length to compress the control spring, each of the plugs being adapted to correspond to a particular motor rating to arrange the characteristics of the overload control to motors of different current ratings.

Another object of the invention is to provide an overload control for an electric motor in which the functions of the overload control can be changed by utilizing a series of manually operated control members that are interchangeable to provide for different functional operations of the overload control, such as reset only, reset and stop, automatic and stop, and automatic only.

Another object of the invention is to provide a thermally responsive overload control that incorporates the features of the foregoing objects in a manner that a single overload control can be made relatively universal in its functions, tripping time and thermal characteristics that can be used for overload protection to a wide range of electric motors.

Further objects and advantages of the present invention will be apparent from the following description, reference being had to the accompanying drawings wherein a preferred form of the invention is clearly shown.

In the drawings:

Figure 6 is a transverse cross sectional view taken along line 6—6 of Figure 2.

Figure 7 is a vertical cross sectional view taken along line 7—7 of Figure 1.

Figures 8 and 9 are plan views of the members of the control provided to effect a change in the tripping current of the control.

Figures 10, 11, 12 and 13 are elevational views of the manually operated control buttons that are interchangeable to effect changing functions in the control.

Figure 2:
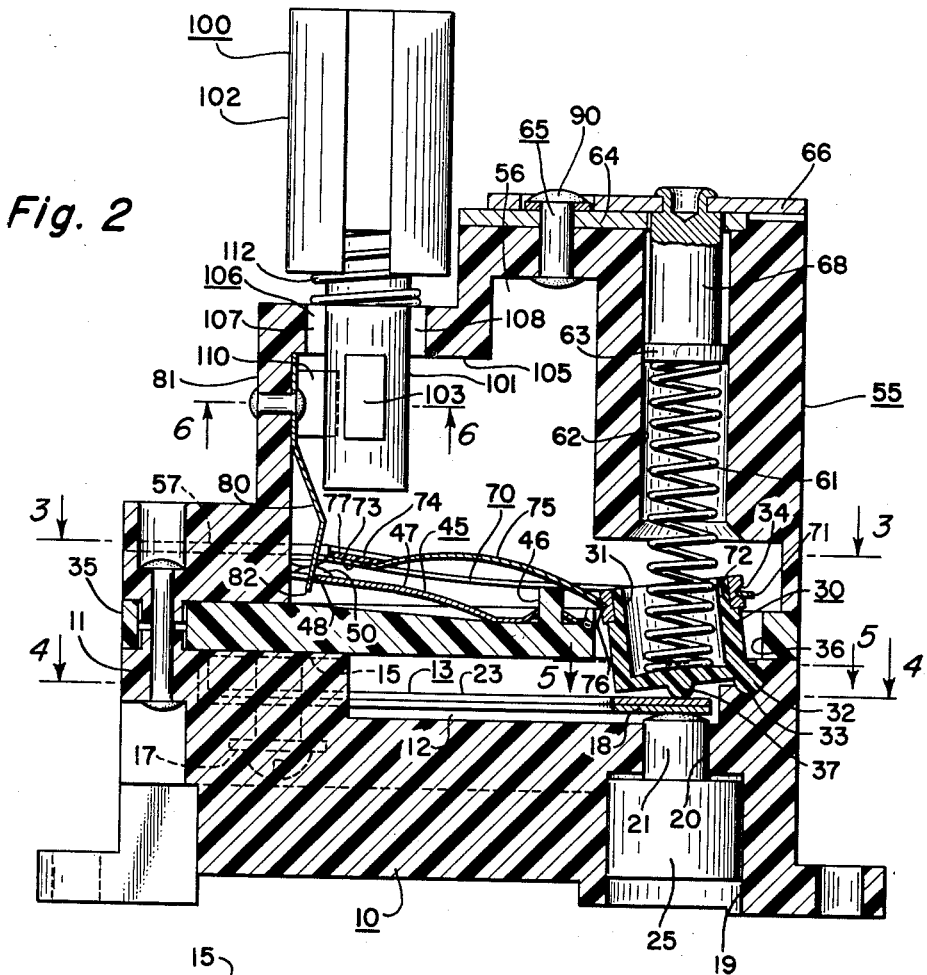
Figure 2 is a longitudinal cross sectional view taken along line 2—2 of Figure 1.

In this invention the thermal control switch that operates as an overload control for an electric motor consists of a base 10 that has a peripheral ridge 11 extending upwardly from the base to form a recess chamber 12. A U-shaped bimetal member 13 is placed in the recess chamber 12 and has the legs 23 and 24 thereof connected with the line terminals 15 and 16 by means of suitable fastening screws 17. The screws 17 also secure each of the legs of the U-shaped bimetal 13 to the base 10. Thus the bight end 18 of the bimetal member 13 is free for movement relative to the base 10.

The base 10 has a recess chamber 19 that has a coaxial opening 20 disposed directly beneath the movable end 18 of the bimetal 13. A highly conductive heated mass 25 is disposed in the chamber 19 and has the reduced diameter portion 21 extending through the opening 20 into engagement with the bimetal member 13 when the bimetal member is at normal ambient temperature as in a substantially unflexed condition, as shown in Figure 2.

The movable end 18 of the bimetal member 13 engages a cylindrical spring cage 30 that has a coaxial bore 31, whereby the spring cage 30 is substantially in the form of a cup. The cage 30 is pivoted upon the base 10 by means of a pivot bar 32 that is substantially tangent to the outer periphery of the cylindrical cage 30, and is thus positioned on one side of the axis of the cylindrical cage. The pivot bar 32 rests in a recess 33 provided in the ledge 11 of the base 10, the bar 32 forming thereby a pivot axis for the spring cage 30 that is normal to the axis of the spring cage. Thus, the spring cage 30 can rotate on a pivot axis normal to its own axis.

The spring cage 30 is provided with a peripheral groove 34 near the upper edge thereof and substantially above the pivot axis 32.

The spring cage 30 is retained in position on the base 10 by means of an intermediate platform 35 that rests upon the ridge or ledge 11. The platform 35 has an opening 36 through which the spring cage 30 extends and in which it is rotatable. The platform 35 engages the upper edge of the pivot rod 32 to retain the pivot rod in the recess 33 in the base 10.

The bottom face of the spring cage 30 has a projection or knob 37 that rests upon the upper face of the free end 18 of the bimetal 13, the knob 37 being coaxially aligned with the axis of the heat absorbing mass 25. Thus, upward movement of the end 18 of the bimetal member 13 will effect clockwise rotation of the spring cage 30 about its pivot axis 32.

Movable contact means 45 is mounted on the upper face of the platform 35 by means of a suitable fastening stud 46. The contact means 45 comprises a T shaped leaf spring in which the stem 47 is fastened to the platform 35 by the stud 46. The head 48 of the T shaped leaf spring 45 carries the contacts 49 and 50.

A cover member 55 is placed upon the intermediate platform 35 and has a chamber 56 therein that receives the movable contact arm 45. A pair of stationary contacts 57 and 58 are adapted to cooperate with the movable contacts 49 and 50, the stationary contacts 57 and 58 being connected with the terminals 59 and 60 that in turn are connected with an electrically actuated solenoid control coil of a main motor starting control to deenergize the solenoid control coil when an overload occurs on the electric motor that has its line current delivered to the motor through the motor starting control. Such a motor starting control is more particularly disclosed and described in my copending application Serial No. 404,843, filed January 19, 1954, and does not constitute a part of this invention.

The spring cage 30 supports one end of a compression spring 61, the other end of the compression spring being disposed within a bore 62 provided in the cover member 55. The bore 62 extends through the top of the cover member 55, the upper end of the spring 61 engaging a button 63 that engages a plate 64 secured to the upper face of the cover member 55 by means of a fastening rivet 65. On the plate 64 there is disposed a second plate 66 retained thereon by a screw 97. A plug 68 extends from the plate 66 into the bore 62 to provide a predetermined compressed length of the spring 61.

The movable contacts 49 and 50 normally assume the position shown in Figure 2 in closed position engaging the stationary contacts 57 and 58 to provide electric circuit to the solenoid coil of the motor starter control hereinbefore referred to.

Figure 3:
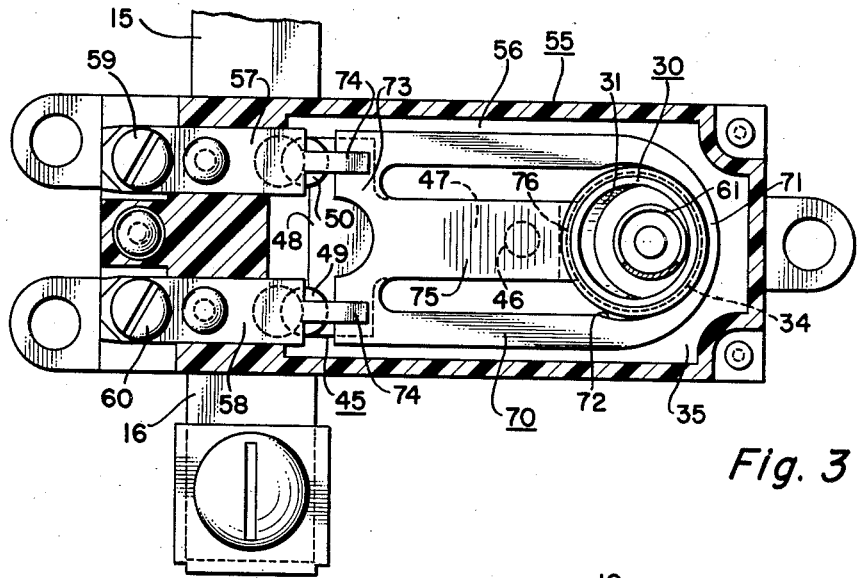
Figure 3 is a transverse cross sectional view taken along line 3—3 of Figure 2.
Figure 4:
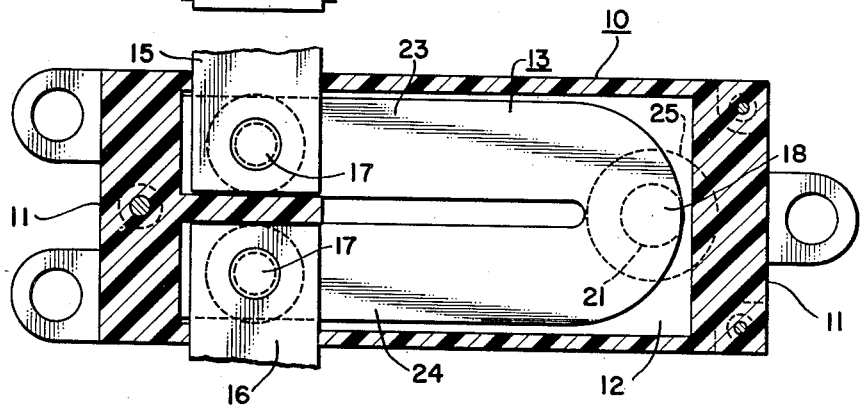
Figure 4 is a transverse cross sectional view taken along line 4—4 of Figure 2.
Figure 5:
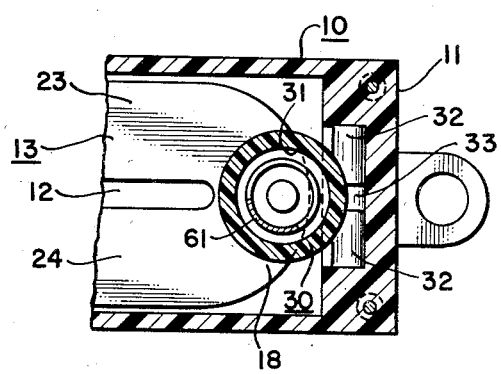
Figure 5 is a transverse cross sectional view taken along line 5—5 of Figure 2.

A snap acting mechanism is provided to break circuit through the aforementioned contacts and thereby open circuit to the solenoid coil of the electric motor starter control. The snap acting mechanism includes the aforementioned spring cage 30 as well as a snap acting spring 70. The spring 70 is in the form of a flat leaf member and is further in the form of a closed elongated loop, as shown in Figure 3. The end 71 of the closed loop encircles the spring cage 30 and has the inner edge 72 thereof resting in the groove 34 on the right hand side of the spring cage 30, as viewed in Figure 2. The opposite end or free end 73 of the closed loop leaf spring 70 is disposed between the movable contact arm 45 and fixed stops 74 that project from the stationary contacts 57 and 58. Integral with the free end of the closed loop leaf spring 70 there is formed a flat leaf spring portion 75 in the form of a tongue that extends from the free end 73 of the spring 70 toward the opposite end 71 thereof. This flat leaf spring tongue 75 has its end 76 thereof disposed in the groove 34 of the spring cage 30 on the side thereof opposite to engagement by the spring cage by the end 71 of the spring 70. As shown in Figure 2 the leaf spring tongue 75 is arched to provide tension to hold the spring 70 on the cage 30.

The normal position of the leaf spring member 70 is as illustrated in Figure 2 with the free end 73 engaging the fixed stop 74. However, when the spring cage 30 is rotated clockwise about its pivot axis 32 by upward flexing of the end 18 of the bimetal member 13, the end 76 of the spring tongue 75 will pass across the plane of the spring 70 and thereby effect a snap acting movement to the end 73 of the spring 70 to cause it to move downwardly, as viewed in Figure 2, and thereby move the movable contact arm 45 to break contact between the movable contacts and the stationary contacts.

When the movable contact arm 45 moves to its downward position, the spring latch member 80 secured to the wall 81 of the cover 55 moves in a right hand direction, as viewed in Figure 2, to place the end 82 of the latch member above the head 48 of the T shaped movable contact arm 45 and thereby retain the movable contacts out of engagement with the stationary contacts. In order to prevent circuit closure through the end 73 of the spring 70 when the spring arm 45 is in its downward position, the lower surfaces of the stops 74 have affixed thereto insulators 77, as shown in Fig. 2.

The operation of the device just described is that which occurs normally when an overload is imparted to an electric motor, at the time an extra heavy current is being drawn through the bimetal member 13. The heavier than normal current drawn through the bimetal member 13 will heat the bimetal and cause it to flex upwardly as heretofore described to effect disconnection between the stationary and movable contacts and thereby deenergize the motor starting control to stop the motor.

It is well known that bimetal elements have certain predetermined thermal characteristics. That is, current loads of predetermined value will cause the bimetal element to flex a predetermined amount in a predetermined time. Bimetal elements can be constructed to give any particular flexing and timing. However, once a thermally responsive bimetal element has its thermal characteristics established, these characteristics will remain relatively constant. Hence, on electric motors of small size, the bimetal members must have one thermal characteristic as distinguished from bimetal members that are used with motors of relatively larger size. It has been the common practice in the manufacture of overload controls for electric motors to utilize a series of precalibrated bimetal members each having its own thermal characteristics so that a relatively wide range of electric motors could be controlled by an overload control with bimetal members having different thermal characteristics depending upon the current load to be carried by the electric motor and the overload current carried therethrough.

In this invention however, the highly conductive heat absorbing mass 25 is disposed in engagement with the bimetal member 13 when in its relaxed or room temperature condition. Thus, when the bimetal member 13 attempts to heat due to current flow through the same, heat will be absorbed by the mass 25 to retard the temperature rise in the bimetal itself and thus retard the time at which the bimetal will flex upwardly, as viewed in Figure 2. It is apparent that merely by changing the size of the heat absorbing mass 25, the time at which the bimetal 18 will begin to flex is changed. The bimetal will of course flex most quickly when no heat absorbing mass is in engagement therewith. This normal flexing characteristic of the bimetal is that which can be used to render the overload control effective for protecting a small size electric motor. If the size of the electric motor to be protected increases, the current flow through the bimetal will increase proportionately thus causing the bimetal to flex more quickly. To hold the flexing time of the bimetal substantially constant as the current flow through the bimetal increases, the size of the heat absorbing mass 25 will be increased proportionately to balance the increased heat created by the increased current flow. While it has been mentioned that the flexing rate of the bimetal can be maintained constant yet it will be appreciated that the flexing rate could be either increased or decreased from that normally considered normal merely by changing the size of the heat absorbing mass relative to the current load that is carried through the bimetal.

With the thermal characteristics of the bimetal 13 controlled by the heat absorbing mass 25 to a relatively constant level it is then possible to control the tripping current of the overload relay by changing the rate or compression of the spring 61. This is accomplished by changing the length of the plug 68 that extends into the bore 62. By increasing or decreasing the length of the plug 68, the compression of the spring 61 is increased or decreased accordingly so that the resistance opposing movement of the bimetal member 13 to effect opening of the movable and stationary contacts is changed to accordingly change the tripping current at which the movable contacts open circuit from the stationary contacts.

The plugs 68 can therefore be predeterminately selected to match the current ratings of electric motors to give specific ranges of operation to the overload relay, each plug 68 being in effect a "rating plug." To provide for permissible change in rating plug 68, and yet prevent an indiscriminate change of rating plugs by which a rating plug for a large horsepower motor could be used for a small horsepower motor, the plates 64 and 66 heretofore described are provided with cooperating openings and projections that permit the change of the plate 66 relative to the plate 64 without confusion of the rating plugs 68.

With reference to Fig. 9, it will be noted that the plate 64 has a pair of openings 91 and 92 adjacent opening 94, one of the openings, 91 or 92, receiving a headed stud 97. The plate 64 is retained in assembled relation with the cover 55 by a rivet 65 having a head which constitutes a fixed projection 90. The position of the plate 64 is changed when a change is made in the bimetal strip 13. Thus, the operating characteristics of the switch assembly may be varied by stacking two or more bimetal strips in the recess 12. In addition different types of bimetal strips may be used having different resistances, temperature activity and thickness. Temperature activity of a bimetal strip is defined as the movement effected or force exerted by the bimetal strip per degree temperature rise.

The plate 66, as shown in Fig. 8, has the rating plug 68 extending from the underside thereof and is also provided with an arcuate slot 95 and a keyhole slot 96.

Figure 1:
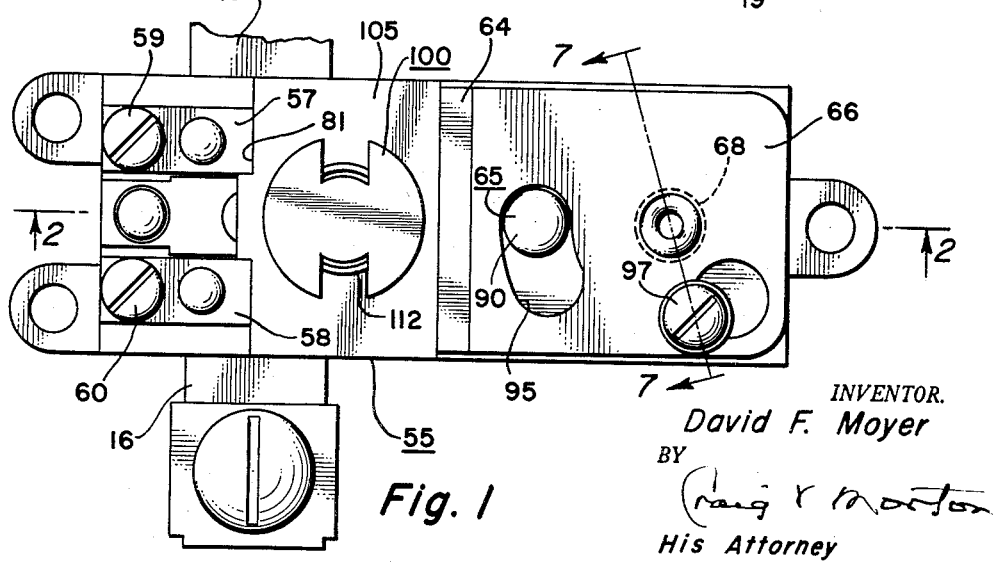
Figure 1 is a plan view of the overload control of this invention.

The plates shown in Figures 8 and 9 are illustrated in position in Figure 1 with the fixed projection 90 being received in the slot 95 on the plate 66 and the headed stud 97 being received in the keyhole slot 96 of the plate 66. The headed stud 97 is preferably a screw that is threaded downwardly onto the plate 66 to hold it when assembled on plate 64.

The plates 64 and 66 illustrated in Figures 8 and 9 are adapted to be used either right side up, as illustrated in Figures 8 and 9, or upside down from which arrangement there is obtained at least four combinations of plate assemblies that are selectively usable only in cooperating pairs. Thus the plate 66 can be provided with four different lengths of rating plugs 68 to obtain four different tripping conditions in the overload control.

If the headed stud 97 is received in the opening 91 in the plate 64, it is apparent that the plate 66 with the rating stud 68 below it could not be used on the plate 64 since the slots 95 and 96 in the plate 66 would not register with the fixed projection 90 and the headed stud 97 now in opening 91. Further, at this time the rating plug 68 would be turned upwardly so it would not enter the bore 62 in the cover 55. The only way by which plate 66 could be placed on plate 64 would be to turn plate 64 upside down and place the hole 92 in its directly opposite corner with the stud 97 entering from the opposite side of the plate, from that shown in Figure 9. But even in this condition with the plate 66 turned upside down with the opening 96 in the upper right hand corner to coincide with the stud 97 now in the upper right hand corner of plate 64 the rating plug 68 would still be turned upwardly so that it would not enter the bore 62 in the cover 55. From this illustration it can be seen that plate 66 has only one combination with the plate 64 in which the rating plug 68 will enter the opening 62 to provide a predetermined compressive setting of the control spring 61.

However, a second rating plate 66a is provided that is adapted to be positioned on the plate 64 in the position shown in Figure 9 with the headed stud 97 in the hole 91. In this instance the keyhole opening 96a in the plate 66a will move over the headed stud in the hole 91 and the slot 95a will properly receive the fixed projection 90 on the plate 64. However, here again if the plate 64 is turned upside down with the stud 92 projecting from the hole 91 from the opposite side of the plate shown in Figure 9, and the plate 66a is turned upside down in an effort to place the keyhole slot 96a over the headed stud now projecting from the hole 91 with the plate in an upside down condition, the proper alignment cannot be obtained nor can the rating plug 68a enter the bore 62 to engage the spring 61.

Thus, by the use of the one plate 64 in either a right side up position or an upside down position with the headed stud 97 being positioned either as shown in Fig. 9 or in the hole 91 with the plate right side up or in either of the holes with the plate upside down, plates 66 and 66a can be used for obtaining four different selective positions of the plates 66 and 66a relative to the plate 64 with each of the plates 66 and 66a having a rating stud projection from either of its opposite sides depending on the specific cooperating position of the respective plates with the plate 64.

After the thermal overload has operated to open the movable contacts 49 and 50 from the stationary contacts 57 and 58 with the spring latch 80 holding the movable contacts in open position, a manually operable member 100 is provided to reset the control. This member 100 consists of a stem 101 on which there is provided the enlarged head 102. Radially extending projections 103 and 104 are provided on the stem 101 and are adapted to engage the underside of the wall 105 of the cover 55. The stem 101 of the member 100 is inserted through the opening 106 in the wall 105 from which there extends the slots 107 and 108 that receive the projections 103 and 104 on the stem 101 when passing the stem through the wall 105. When the projections 103 and 104 have passed through the wall 105 the member 100 is rotated manually whereby the spring fingers 110 and 111 engage the respective projections 103 and 104 to prevent any rotation of the member 100 and thus prevent its retraction from the cover after it has once been inserted.

The lower end of the stem 101 shown in Fig. 2 is adapted to engage the latching spring 80 to move it in a left hand direction to release the movable contact arm 45 when the member 100 is positioned downwardly against the resistance of the compression spring 112.

In Fig. 11 there is shown another manually operated member 100a that has an additional projecting stem 115 that is adapted to engage the movable contact arm 45 when the member 100 is positioned downwardly. This member 100a includes the same stem 101 so that it will provide for both resetting of the control device and a stop operation when placed manually, the stop operation cannot be performed by the member 100 shown in Figure 2.

In Figure 12 there is illustrated another configuration on the end of the manual member 100b by which an automatic operation as well as a stop operation is obtained when this member is substituted in the control device for the member 100. In the member 100b of Figure 12 the stem 101b is longer than the stem 101 of the member 100 so that the latch member 80 will not be allowed to engage the movable contact arm 45 at any time. The projection 115b provides a member that engages the movable arm 45 to manually break circuit through the movable and stationary contacts when the member 100b is moved downwardly. Since the latch member 80 cannot engage the movable arm 45 whenever the thermal control device is actuated by the bimetal member 13, it will be apparent that the device will automatically reset itself after each actuation by the bimetal member 13.

Still another member 100c is depicted in Fig. 13, by which only automatic operation is obtained when this member is substituted for member 100. The enlarged head 102c is of greater length than the head 102b of the member 100b so that when the member 100c is assembled with the cover 55 it cannot be manually depressed. Thus, the distance between the head 102c and the projections 103c and 104c is equal to the thickness of the cover 55. In addition the stem 101c is shorter than the stem 101b of the member 100b since the member 100c is adapted for automatic operation only. The spring 112c is merely used to maintain the member 100c under spring pressure when it is assembled with the cover 55.

While the form of embodiment of the invention as herein disclosed constitutes a preferred form, it is to be understood that other forms might be adopted as may come within the scope of the claims which follow.

What is claimed is as follows:

1. In a circuit breaking device having a movable thermally responsive element to actuate the device, the improvement comprising, spring means engaging said element to resist movement thereof in one direction, plug means positioned between said spring means and a fixed stop to regulate the compressive effectiveness of the spring means and removable for exchange with other plug means of different length to change the compressive effectiveness of the spring means and thereby its resistance to movement of the said thermal element, and a heat conductive mass having a high capacity of heat absorption engaged by the thermal element when the said element is inactive at normal ambient temperature to absorb heat from the element during initial actuating heating thereof to delay its initial temperature rise for actuation of the said device only until the thermal element moves out of engagement with the said mass, the said mass being removable for exchange with other heat conductive masses of other mass size to change thereby the heat rise thermal characteristic of the thermal element only until the thermal element moves out of engagement with the mass.

2. A circuit breaking device, including, a thermally responsive current sensitive bimetal element having a movable end and adapted to carry an electric current to effect temperature rise of the bimetal and thereby flexing thereof, circuit breaking means operably connected with said bimetal element for actuation thereby, spring means operably engaging the movable end of said bimetal element to resist movement thereof in one direction to regulate actuation of said circuit breaking device, a heat conductive element having a high rate of heat absorption engaged by said bimetal element when the bimetal element is inactive normally to delay temperature rise of the said bimetal element when rendered active by current flow therethrough, said bimetal element being movable from engagement with said heat conductive element upon a predetermined rise in temperature of the bimetal element to render thereby the heat conductive element ineffective from further heat rise of the said bimetal element.

3. A circuit breaking device in accordance with claim 2 in which the heat conductive element is removable and exchangeable for another of different mass size to change the rate of heat absorption from the bimetal element, and plug means is positioned between said spring and a fixed stop removable and exchangeable with other plug means of different lengths to change the compressive effectiveness of the spring means and thereby the resistance thereof to movement of the bimetal element.

4. In a circuit breaking device having a circuit breaking mechanism operably connected with and actuated by a temperature sensitive mechanism including an actuating element for the temperature sensitive mehanism, the improvement comprising, spring means positioned between said actuating element and a fixed wall, said wall having an opening coaxial with said spring, plate means removably mounted on said wall and having plug means extending therefrom and extending through said opening into engagement with said spring compressing the same to an extent controlled by the length of the plug means whereby to regulate tripping action of the actuating element on the circuit breaking mechanism, said plate means being interchangeably attachable on said wall in identical position on the wall with other like plate means having plug means thereon of different length to change the compression of the spring whereby to change the tripping action of said actuating element according to the length of the plug means on the plate means disposed on the said wall.

5. In a circuit breaking device having a circuit breaking mechanism operably connected with and actuated by a temperature sensitive mechanism including an actuating element for the temperature sensitive mechanism, the improvement comprising, spring means positioned between said actuating element and a fixed wall, said wall having an opening coaxial with said spring, said wall also having a pair of projections extending from the same side of the wall adjacent the said opening, plate means having plug means extending from one side thereof and having a pair of openings through the plate means, said plate means being removably disposed on said wall with said plug means extending through said opening into engagement with said spring compressing the same to an extent controlled by the length of the plug means and with the openings in the plate means receiving the projections on the said wall, said plug means regulating the compression of the spring to control tripping action of the actuating element of the circuit breaking mechanism, said plate means being interchangeably attachable on said wall in identical position on the wall with other like plate means having plug means thereon of different length to change the compression of the spring whereby to change the tripping action of said actuating element according to the length of the plug means on the plate means disposed on the said wall.

6. A circuit breaking device in accordance with claim 5 in which one of said projections on said wall is immovably fixed and the other of said projections is removably mounted for disposition in a like position on the said wall diametrically opposite the first position relative to the said opening, each of said plate means being disposable on said wall in either of two turn-over positions to dispose one of said openings in alignment with the fixed projection and the other of said openings in alignment with the removable projection depending on the position of the said removable projection relative to the said opening, the said plug means on the plate means being projectable from either side of the plate means and having different length also depending on the position of the removable projection relative to the said opening to effect thereby regulation of the tripping action of the said actuating element by the position of plate means on the said wall with plug means thereon of controlled length regulated by the turn-over position of the plate means on the said wall.

7. A circuit breaking device in accordance with claim 5 in which one of said projections on said wall is immovably fixed and the other of said projections is removably mounted for disposition in a like position on the said wall diametrically opposite the first position relative to the said opening, each of said plate means being disposable on said wall in either of two turn-over positions to dispose one of said openings in alignment with the fixed projection and the other of said openings in alignment with the removable projection depending on the position of the said removable projection relative to the said opening, the said plug means on the plate means being projectable from either side of the plate means and having different length also depending on the position of the removable projection relative to the said opening to effect thereby regulation of the tripping action of the said actuating element by the position of plate means on the said wall with plug means thereon of controlled length regulated by the turnover position of the plate means on the said wall, and in which said projections on the said wall and the said openings in the said plate means are disposed on different radial centers relative to the said opening in said wall and the plug means on the said plate means to prevent the opening in the plate means adapted for alignment with the fixed position projection on the wall from aligning with the removable projection on the said wall.

8. A circuit breaking device, including in the combination, stationary contact means, movable contact means normally resiliently urged against the stationary contact means in closed position, and an actuating mechanism to actuate the movable contact means comprising, a spring retainer cup pivotally mounted at one side of the axis thereof for pivotal rotation normal to the axis of the retainer, an actuating element adjacent the retainer and engaging the same to effect the said pivotal rotation thereof, spring means having one end seated in said retainer cup to resiliently oppose the action of said actuating element, and a snap acting leaf element in the form of a closed loop having one end carried on said retainer above the pivotal axis thereof and the opposite end free for actuating movement between said movable contact means and a fixed stop thereadjacent and including a spring leaf fixed at one end to the free end of the loop with the spring leaf arched with the opposite end engaging said retainer above the pivotal axis thereof on the side thereof opposite to engagement of the retainer by said closed loop and cooperating with the loop to form an over-center snap acting device to effect movement of the free end of the loop on pivotal rotation of said retainer to shift the end of the spring leaf engaging the retainer relative to the plane of the loop.

9. A circuit breaking device in accordance with claim 8 in which the actuating element is a current sensitive bimetal member having a free movable end disposed at one side of the retainer on one side of the pivot axis thereof and the spring means engages said retainer on the opposite side thereof on the opposite side of the pivot axis.

10. In a circuit breaking device having a housing enclosing a circuit breaking mechanism operably connected with and actuated by a current sensitive thermally responsive element and including a latch member engageable by the circuit breaking mechanism to hold the same in open position when the said mechanism is actuated by the said thermally responsive element, the combination, a movable member carrying a contact for engagement with a stationary contact, a latch member in the form of a leaf spring having one end stationarily attached to the housing and the opposite end being free and engageable with said movable contact carrying member to latch the same out of engagement with the stationary contact, said latch member having a raised portion engageable by a device for resetting the movable contact member upon disengagement of the latch member from the movable contact member, said device comprising a plunger reciprocable in an opening in said housing, said plunger having projections insertable through similarly shaped openings in said housing upon insertion of the plunger into its opening in the housing, said plunger being rotatable after insertion in its opening in the housing to displace the projections circumferentially from the openings in the housing through which the projections were inserted, and spring means engaging the projections on said plunger to prevent rotation thereof after its insertion into its opening and the rotation thereof for the said displacement of the said projections, whereby to prevent removal of the device from the housing after insertion into the housing.

11. A circuit breaking device, including a thermally responsive bimetal element having a movable end and adapted to respond to heating of the element to effect temperature rise of the bimetal and thereby flexing thereof, circuit breaking means operably connected with said bimetal element for actuation thereby, spring means operably engaging the movable end of said bimetal element to resist movement thereof in one direction to regulate actuation of said circuit breaking device, a heat conductive element having a high rate of heat absorption engaged by said bimetal element when the bimetal element is inactive normally to delay temperature rise of the said bimetal element when rendered active by heating thereof, said bimetal element being movable from engagement with said heat conductive element upon a predetermined rise in temperature of the bimetal element to render thereby the heat conductive element inactive from further heat rise of the said bimetal element.

References Cited in the file of this patent

UNITED STATES PATENTS

| | | |
|---|---|---|
| 1,631,679 | Hall | June 7, 1927 |
| 1,692,474 | Traver | Nov. 20, 1928 |
| 1,809,293 | Claytor | June 9, 1931 |
| 1,980,756 | Hoover | Nov. 13, 1934 |
| 2,116,215 | Ruben | May 3, 1938 |
| 2,144,120 | Parks | Jan. 17, 1939 |
| 2,196,393 | Ireland | Apr. 9, 1940 |
| 2,197,221 | Koci | Apr. 16, 1940 |
| 2,214,645 | Townsend | Sept. 10, 1940 |
| 2,217,488 | Mahnke | Oct. 8, 1940 |
| 2,361,162 | Arnold | Oct. 24, 1944 |
| 2,402,240 | Crise | June 18, 1946 |
| 2,418,537 | Wood | Apr. 8, 1947 |
| 2,436,909 | Werner | Mar. 2, 1948 |
| 2,455,011 | Ingels | Nov. 30, 1948 |
| 2,707,738 | Weissheimer | May 3, 1955 |